March 27, 1934.   P. G. WILLETTS   1,953,034
SHALLOW MELTING TANK
Filed Dec. 9, 1927
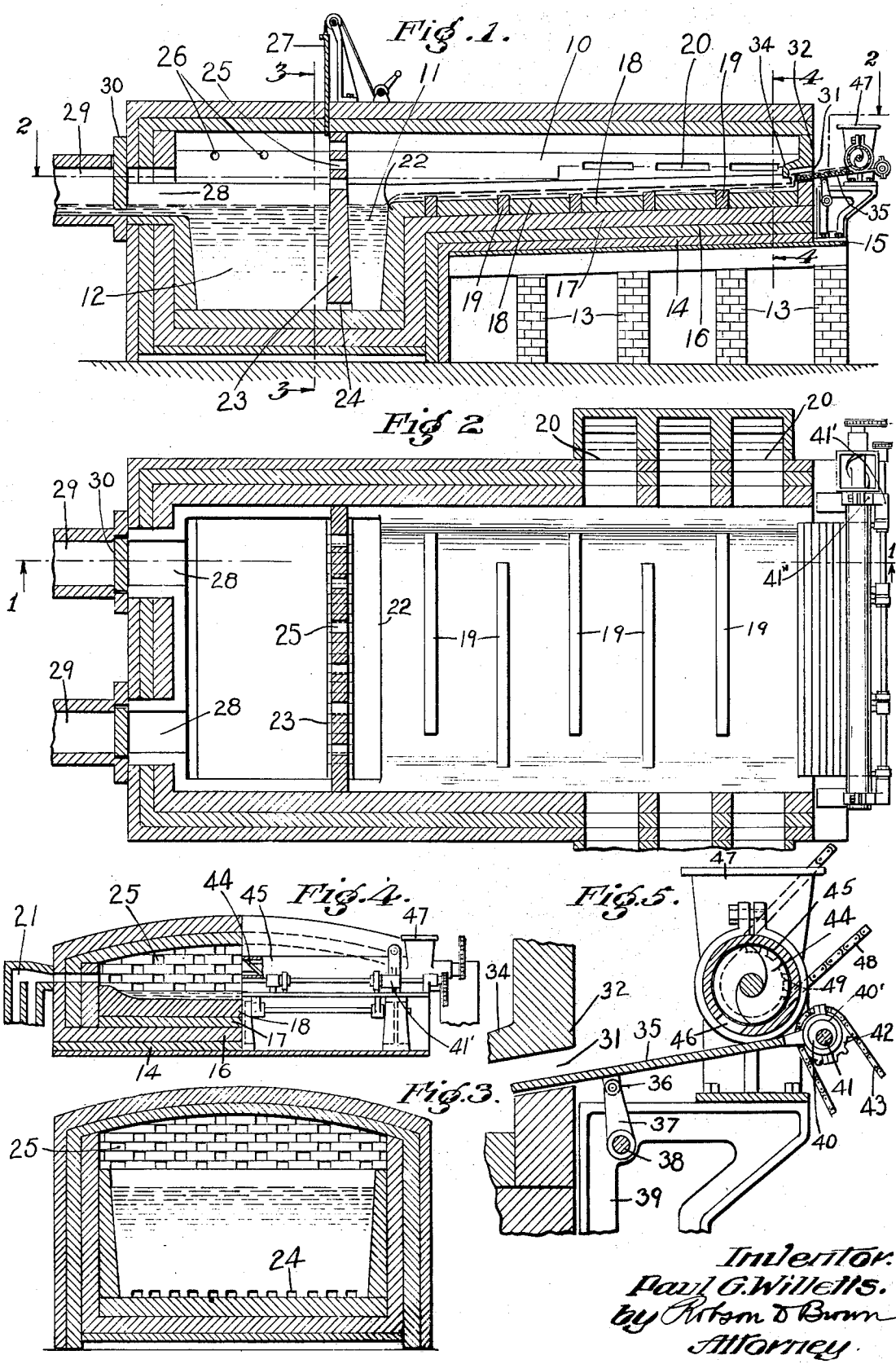

Patented Mar. 27, 1934

1,953,034

UNITED STATES PATENT OFFICE 1,953,034

SHALLOW MELTING TANK

Paul G. Willetts, West Hartford, Conn., assignor to Hartford Empire Company, Hartford, Conn., a corporation of Delaware Application December 9, 1927, Serial No. 238,814

12 Claims. (Cl. 49—54)

My invention relates to glass melting tanks and to methods of supplying glass batch thereto, fusing the glass, mixing and refining the glass and suitably tempering the glass for delivery to the glassware fabricating mechanism.

The general object of my invention is to provide methods and apparatus, whereby glass batch continuously fed to a melting tank is rapidly processed and supplied in a superior condition at the rate at which it is needed for fabrication by glass working machinery.

Among the other objects of my invention are:—

(1) The provision of a tank having a melting and first refining portion in which the glass is made and processed in thin layers;

(2) The provision of such a tank having a substantially sloping floor or bottom to provide a gravity flow of glass as fused;

(3) The provision of baffles or stirring members in such a tank to stir and turn over particles of glass and batch to assure rapid and complete fusion and to facilitate the release of gases included in the melting glass;

(4) The provision of structure so designed that the maximum heat is applied directly to the melting glass and batch;

(5) The provision of means for continuously feeding batch into the melting chamber in thin layers spread substantially across the chamber, to the end that thin widely spread layers may be rapidly reduced to glass and moved forward to make room for the oncoming batch; and by this means assuring that there be provided a uniform supply of glass entirely across the melting end of the chamber, which is in a uniformly melted condition at the beginning of its forward movement;

(6) The provision of control of the rate of feed of batch into the tank and the melting thereof to suitably supply glass at a variety of speeds suitable for a variety of glass fabricating demands, thus at all times maintaining the level of glass at the working end of the tank constant, and so facilitating the work of automatic feeders;

(7) The provision of insulation, structural and heating arrangements throughout the tank, and more particularly in the melting and first refining portions thereof, such that the glass moves in full cross section through the tank, and whereby objectionable transverse convection currents are minimized and channeling avoided;

(8) The provision of final refining and tempering chambers having relatively deep baths separated by a bridge wall and communicating through a plurality of throats spaced substantially across the width of the tank to assist in maintaining the full cross sectional flow of glass through the tank;

(9) The provision of specially designed structure adapted to minimize the wear upon the tank blocks.

Other objects of my invention will appear from the following specification and subjoined claims.

The numerous advantages of my invention and novel features thereof will be readily understood from a consideration of the apparatus and methods heretofore employed in the melting of glass batch.

Heretofore glass has usually been melted in large tanks having capacities of from 20 to 70 tons a day, these structures being of such size that they constantly contain melted glass to the amount of as much as from 100 to 250 tons. This contained glass stands in a bath of from 30 to 60 inches in depth. Periodically at intervals varying from 20 to 40 minutes, relatively large supplies of new batch are charged into the rearward end of these tanks. This quantity of new batch forms an island or "iceberg" which floats partially submerged and partially above the glass already melted and is gradually carried forward toward a bridge wall separating melting and refining end from the tempering end of these furnaces. During its passage, the batch is subjected to heat applied to the surface of the glass and radiating from the upper portions of the walls and roofs of these large structures. The glass is slowly melted, and even more slowly refined, on its passage toward the front end. As it reaches the bridge wall which extends from the bottom of the tank part way toward the top and above the glass level and in which there is usually a single throat about midway of the wall, the lower portions of the melted glass pass in a single channel into the working out or tempering end of the tank.

These tanks are composed of refractory blocks which are rapidly eroded by the contact of the glass therewith. The blocks heretofore used for these walls have been of such a character that they must be maintained relatively much colder than the glass in the interior of the furnace, and this heat differential causes objectionable cross sectional convection currents which tend to increase the rate of erosion of the blocks. This erosion not only tends to rapidly destroy the tanks, but by the addition of the tank block material to the glass changes the chemical and physical characteristics of the glass itself.

Because of the lower temperature at and near the walls of these large tanks, the portions of glass in different portions of any cross section of the tank are of different viscosities, and hence flow at different rates, the hotter glass flowing in channels formed in relatively immobile masses of colder glass. While this channeling of itself is not particularly detrimental to the quality of the glass delivered so long as the temperature conditions throughout the tank remain constant, it is a serious source of trouble upon each change in the heat conditions within the tank, as the colder glass begins, upon an increase of heat, to move at a different rate and adds to the glass moving in the channel portions of glass having different heat history and hence different consistency and different characteristics. Such heat changes, therefore, eventuate in bad glass at the working end of the tank. The channeling effect is emphasized by the use of the single throat through which the glass must pass to the work-out end of the tank.

The use of the large tank, as above described, is wasteful to a very large degree, as it requires large areas of tank structure and glass to be maintained at the melting temperature in order to reduce a given unit of batch to glass. The time of refining in these structures is also unduly long by reason of the fact that the gases included in the melting and refining glass are liberated very slowly through the deep baths of the glass used.

The method of charging these tanks periodically in relatively large batches results in the direct application of heat only to the relatively small exterior portions of the batch, which exterior portions as they melt form a heat insulation to the inner portions of the batch, which inner portions are sometimes not completely melted prior to their passage out of the melting zone. Hence, portions of inadequately melted or unmelted batch are often carried forward into the tempering or work-out chamber.

As a rule, the prior art furnaces are made with perpendicular walls. As movement of glass caused by the aforesaid differences in temperature between the walls and the exterior of the batch is from the center of the tank outwardly toward the walls, down along the walls and upwardly again at the center of the glass, excessive wear upon the portion of the tank wall at the glass line results. Also, the thrust of the pressure upward of gases liberated by the processing of the glass on a straight wall causes wear out of all proportions, due either to the heat, corrosion, or the movement of the glass.

The level of the glass in these tanks is obviously variable, and this requires special provisions when glass is automatically fed, as most automatic feeders require substantially constant head or level. Furthermore, these prior art tanks are so designed that they work properly only at one particular rate and are subject to infinite difficulties when the rate of withdrawal is changed. Much time and loss in glass production follows each change in the rate of production therefrom.

The faults and difficulties above described are overcome or minimized by the use of my novel method and apparatus, the mechanical features of one form of which are shown in the attached drawing, in which Figure 1 is a vertical section of a tank embodying my invention, taken on the line 1—1 of Fig. 2;

Fig. 2 is a horizontal section of the same taken on the line 2—2 of Fig. 1;

Fig. 3 is a section thereof taken on the line 3—3 of Fig. 1;

Fig. 4 is a view partly in section taken on the line 4—4 of Fig. 1 and partly an end elevation from the right of Fig. 1; and Fig. 5 is an enlarged view of the batch feeding apparatus shown in Fig. 1.

In the illustrated embodiment of my invention there shown, the tank comprises a long shallow melting and primary refining portion 10, a relatively deep final refining portion 11 and a tempering portion 12. The melting portion 10 is mounted on suitable pedestals 13 to raise the bottom of that portion above the portions 11 and 12. The tank is made up of a layer of refractory insulating tile 14 laid on a metallic or other suitable table 15 which is supported by the pedestals 13. On the tile 14 is a layer of heat insulating brick 16 and on this, in turn, is a layer of high quality fire brick 17. As shown, the layers 16 and 17 of insulating brick and fire brick surround all portions of the structure. Forming the bottom and glass contacting side portions of the tank is a lining made of high quality flux blocks 18 having high resistance to heat and to erosion of the glass. This portion 18 is preferably made of a super-refractory material such as that disclosed in my U. S. Patent 1,605,885, issued Nov. 2, 1926.

The bottom of the melting and primary refining parts of my tank is on a higher level than the bottoms of the chambers 11 and 12, and is so situated that substantially all parts thereof are above the normal glass level maintained in the chambers 11 and 12. The bottom of the portion 10 is preferably provided with up-standing baffles 19 extending alternately from either side of the furnace a distance of more than half but less than the width of the chamber. These baffles are made of flux blocks similar to those used for the lining 18. The floor of the chamber 10 is given a slope from rear to front to effect a gravity forward movement of the glass as melted. This slope may be of any degree found desirable, such for instance as a slope of 6 inches for 25 feet of length. It is noted that the baffle members 19, from the rear of the furnace, are made progressively higher, for a purpose which will be hereafter described.

The bottom of the chamber 10 is sloped upwardly at the sides of the chamber to a point above the glass level, which slope is such that the pressure of the gases liberated during melting and refining against the sides of the chamber are relieved. By this arrangement, the wear in the melting chamber is made substantially uniform.

The melting chamber is provided with suitable firing openings 20 connecting with any proper type of regenerator or recuperator, such as is indicated at 21 (Fig. 4), the openings 20 being located toward the rearward end of the tank in order that the zone of greatest heat shall be at the point of delivery of the batch to the furnace.

The crown of the melting chamber is comparatively low and close to the surface of the glass and is preferably made with a comparatively flat arc to bring the heat radiating surfaces close to the surface of the glass and to confine the flames in a relatively small chamber.

The portion 11, which may be termed the final refining compartment, as the preliminary refining of the glass takes place in the melting chamber 10, particularly the forward portion thereof, is substantially a continuation of the melting chamber, though its bottom is considerably below that of the melting chamber. The lining 18 of the melting chamber is sloped rapidly downward from the point 22 and forms the rear wall of the chamber 11 over which the glass melted in the melting chamber flows into the chamber 11.

The portion 12, termed the tempering or workout chamber, is larger than the chamber 11 and of similar depth thereto and is divided from the chamber 11 by the wall 23 made either entirely of flux blocks or of a combination of flux blocks below and highly refractory material above the glass level. The wall 23 extends across the furnace and completely separates the chambers 10 and 11 from the chamber 12, save that a series of throat openings 24 are provided at the bottom of the wall to permit passage of glass from the lower strata of that contained in the chamber 11 into the chamber 12, and except that, if desired, the wall above the glass level may contain openings 25 to permit passage of heat to a controlled degree from the chambers 10 and 11 into the chamber 12. If desired, the openings 25 may be omitted and the chamber 12 supplied with an auxiliary heating means indicated by the burner openings 26 to assure that the glass is brought to the desired temperature. If desired, the burners may be either omitted or retained and a heat shield, indicated at 27, adapted to be regulably positioned to control the degree of heat passing through the openings 25, may be provided.

I contemplate that the chamber 12 will primarily act as a cooling chamber, as I propose preferably to apply a very high degree of heat to the glass in the melting chamber 10 to cause extremely rapid fusion and refining of the glass, and that the heat so acquired by the glass and carried by it to the chamber 12 will maintain the chamber 12 at a sufficiently high temperature. The auxiliary burners 26 or the shield 27, if provided, are to be used primarily to bring the chamber up to the desired temperature after the tank has been shut down and has been permitted to cool. It is thought that it will not be necessary to use these heating means during the continued operation of the tank, though, if desired, they may be then used.

The chamber 12 is provided with suitable openings 28 from which the glass may be removed either automatically or by hand and may be connected, as shown, with automatic feeder forehearths 29 which may themselves be so formed as to further temper and condition the glass for the uses of the feeder. The rate of flow to the forehearth may be controlled through the adjustable gates 30.

The batch to be melted is fed into the rear of the melting chamber through a suitable opening. The feed is preferably continuous and the batch is so deposited in the furnace as to form a thin layer on the floor, or on such portion of the previously melted batch as has not passed the first baffle 19, extending substantially across the furnace. This may be accomplished by any suitable means, as for instance, by a vibrating table or chute upon which regulated quantities of batch are continuously or periodically placed by hand or by any suitable mechanical means, as by a screw conveyor mechanism, such as shown in the drawing.

As illustrated by the drawing, the rearward end of the melting chamber 10 is provided with a slot opening 31 extending substantially across the furnace through which batch may be delivered to the tank. The rear wall 32 above the slot 31 may be supported by any suitable means, such as a bracket, and is provided with an inwardly and downwardly extending portion 34 to form a heat shield over the slot 31. Batch is continuously delivered through the slot 31 to the furnace from a table 35, the forward end of which projects into the slot 31. This table may be internally water cooled, if it be found necessary for its proper operation and to prevent clogging of the slot 31 by a premature melting of the glass batch therein. The table 35 may be pivoted as at 36 upon a link 37 which in turn is pivoted as at 38 upon a bracket 39 mounted upon an extension to the supporting table 15. The other end of the table is connected with suitable connections 40' to eccentrics 40 mounted on a shaft 41 mounted in bearing 41' carried by bracket 41'' clamped to the batch distributing mechanism hereinafter described. A sprocket 42 fast on the shaft 41 is driven by a chain 43 from any suitable source of power (not shown) preferably a variable speed motor. By this arrangement, the table is given a slight vibratory or oscillating movement toward and away from the opening 31 to assist in the movement forwardly into the furnace of batch fed thereto.

Above the rearward portion of the table is provided a screw conveyor 44 suitably mounted on extensions of the bracket 39 and having a shell portion 45 provided with a slot 46. The shell portion communicates at one end with a hopper 47 in which suitable mixtures of batch are constantly maintained and may be open at the opposite end to assure against clogging of the feeding mechanism. The screw 44 may be driven at suitable speeds through the chain 48 and sprocket 49 from any suitable and preferably variable speed source of power (not shown). If desired, the structure may be so made that the width of slot 46 may be varied, or the slot may be provided with an automatically operated shutter (not shown) adapted to periodically open to deposit batch upon the table.

The operation of the batch feeding portion of the apparatus is as follows:—the batch continuously maintained in the hopper 47 is fed forwardly by the screw conveyor 44, and portions thereof are progressively deposited through the slot 46 across the table 35, or if a shutter be used periodically across the table which through its oscillations moves these portions continuously forward and into the slot 31 of the furnace. The direct application of the flames to the batch while it remains upon the table is prevented by the shield 34. The batch is thus fed into the container in a thin continuous layer across the entire rearward portion of the tank.

As the glass is maintained at this point in the tank in a bath of slight depth, say from 1 to 6 inches, and as the melting batch and the melted glass flow forward partially over the tops of the baffles 19, as shown in Fig. 1, and partially in a sinuous path around the staggered ends of the baffles, but all at a comparatively rapid rate, the batch so fed tends to form a thin sheet spread on the top of the glass already in the container over a large surface of the glass where it is directly exposed to the intense heat in the melting chamber. The fusion of the batch is hence very rapid and as the depth of the melting portions is negligible, the included gases of fusion and air are very rapidly liberated. As the fusing batch approaches the baffles 19, it is mixed and kneaded, and the particles of batch scrubbing over and passing around these baffles are turned over to present new surfaces to the direct action of the flames. As the glass moves forwardly on the sloping floor of the melting chamber and the depth of the glass and batch increases, it continues to encounter baffles 19 which are made progressively higher to continuously cause a stirring and turning over of the glass and batch. The increase in the height of the baffles as the depth of glass increases assures that the lighter and least melted glass on top will be repeatedly subject to the scrubbing action by which more rapid and complete reduction is effected. It is noted that the baffles 19 do not extend entirely across the melting chamber so that portions of the lower strata of the glass may pass around these baffles so that the glass is given a thorough mixing and a constant agitation during the melting and preliminary refining periods.

By the time the glass has reached the point 22 at the end of the melting compartment 10, it is thoroughly melted and the refining operation substantially complete. From this point the glass falls into the chamber 11 where the lighter and less well refined glass remains at the top for further refining, while the more perfectly melted and refined glass descends to the bottom and passes through the plurality of throats 24 into the tempering chamber 12. In the tempering chamber, the glass is cooled down to, or approximately to, the temperature desired for the feeding operation. The final control of the temperature of the glass, now otherwise in perfect condition, may be completed if desired in the forehearths 29 or backward extensions thereof.

If desired, and the accuracy of the operations require it, the openings 28 may communicate with additional tempering chambers either in cross section similar to the feeder forehearths, or similar to the chamber 12, though preferably of less depth than the latter.

By the provision of thorough insulation of the tank, and particularly of the melting chamber, I am enabled not only to economically maintain the desired melting temperature in that chamber, in which I am also aided by the particular construction described, but I am enabled to maintain each cross section of the chamber at substantially a uniform temperature. By the provision in this chamber of a shallow bath of glass permitting rapid heat penetration throughout the glass together with the maintenance of the walls of the tank at substantially the high temperature of other portions thereof, I avoid or minimize the objectionable cross sectional currents and the objectionable channeling of the glass, and save as the glass is directed and stirred by the baffles 19, its flow is substantially uniform throughout its cross section.

I may, if desired, omit the baffles 19 and still obtain, by my novel methods, highly desirable results in the rapid and complete melting and handling of the glass, in which event the glass flows through its cross section at substantially uniform rates. This flow is continued throughout the entire device, being aided thereto by the use of a pluarlity of throats 24 in the wall 23.

If desired and for the purpose of more rapidly cooling the glass in the tempering chamber, some or all of the insulation may be removed. Such removal will tend to the introduction of convection currents which, in turn, tend toward greater wear of the chamber walls. The use of the super-refractory above suggested greatly reduces the erosion caused by the glass under these conditions. Further, by providing sloping walls, as shown in the drawing, I further reduce the wear thereon and particularly such wear as may be chargeable to the upward thrust on the wall.

Tanks of the above described construction, since they make glass much more rapidly than the old structures, can be made comparatively small. For instance, they may be made of productive capacity only sufficient to supply one feeder or two feeders. They will, therefore, require much less material and labor in their construction, and when repairs are necessary may be shut down and repaired with much less disturbance to the production of the factory than now occurs on the shut down of the prior art tanks.

It will be apparent that by the use of the described structure and by suitable regulation of the speed at which the batch is supplied to the tank and of the heat supplied to melt it, the productivity rate of the tank may be varied within wide limits. The tank, therefore, can be rapidly and economically changed from use in one fabrication operation to another—the full cross sectional flow of glass preventing a lag between the two kinds of production which in the prior art tanks resulted in large quantities of bad and unusable glass.

As the batch is fed by suitably regulated means to the tank at speeds and in amounts corresponding to the withdrawals of glass from the tank, the level in the final refining and tempering portions of the tank may be readily maintained constant, which, as above indicated, is a feature of great value when the withdrawal of glass is accomplished by automatic means.

It is to be noted that in the preferred embodiment of my invention, the movement of the glass through the melting chamber is primarily by gravity, the surface on which the glass is fed being substantially above the level of the glass maintained in the refining and tempering chambers. I consider this feature of great importance, as it assures the positive removal from the melting chamber of the glass as melted and thus that each newly fed-in portion of batch meets precisely the same correct conditions in the melting chamber. Hence with the same batch constituents and the same melting conditions which, as pointed out, are uniform throughout each cross section of the melting chamber, all of the glass will reach the final refining chamber in the same period of time and in the same condition.

It is obvious that the embodiment of my invention may be varied in numerous particulars well within the spirit of my invention, which invention is not to be limited, save by the appended claims which are to be as broadly construed as the art will permit.

Having fully described my invention what I claim is:

1. Apparatus for making glass comprising a melting compartment having a shallow glass basin provided with a forwardly sloping bottom, baffles projecting upwardly from the substantially smooth bottom of said melting compartment and adapted to be submerged by the glass for imparting a turbulent flow thereto, means for spreading a thin layer of batch over the rearward portion of said basin, and means for heating the batch.

2. In a glass tank, apparatus for continuously feeding batch in thin layers over wide cross sections of said tank, comprising a table, means for continuously oscillating the table, a continuous supply of batch, and means for continuously conveying small portions of said batch to said table.

3. In a glass tank, means for feeding batch to the rear end of the glass tank, comprising a shielded opening in said tank extending substantially across said tank, a conveyor member having its delivery end associated with said opening and mounted for oscillation toward and from the tank, means for oscillating the conveyor, a continuous source of supply of glass batch and a screw conveyor associated therewith adapted to convey the batch to the oscillatory conveyor and to deposit it in thin layers across said oscillatory conveyor.

4. In a tank furnace for melting glass, a glass containing portion substantially rectangular in plan and divided into a shallow melting and preliminary refining section and a relatively deep final refining and tempering section, means for feeding glass batch thereinto, means for continuously reducing the batch to glass and means in the preliminary refining chamber for producing a turbulent flow of the glass and thereby agitating it to eliminate gas bubbles.

5. In a tank furnace for melting glass, a glass containing portion substantially rectangular in plan, means for feeding batch into the glass containing portion, means for reducing the batch therein to glass, means for refining the glass so made and a plurality of baffles of less height than the normal glass level in said tank extending only part of the way transversely of the glass containing portion and placed in staggered relation whereby a portion of the melted glass is caused to take a path of flow around the opposite ends of alternate baffles and other portions caused to flow over said baffles.

6. The method of making glass which comprises feeding glass batch to a melting furnace, melting the batch at one end of the furnace, flowing the glass down a bottom of the furnace, and, while it is thus flowing, causing portions of the glass to meet other portions thereof at approximate right angles a plurality of times, whereby the glass is thoroughly agitated, and thereafter passing the glass so made into a relatively deep bath of molten glass.

7. In a stationary furnace for the melting of vitreous substances, a melting chamber, a supporting surface therein, and flow-distorting elements on said supporting surface each terminating short of one edge of the supporting surface.

8. In a stationary furnace for the melting of vitreous substances, a melting chamber, an inclined supporting surface therein, and a plurality of baffles approximately perpendicularly connected to said supporting surface.

9. In a furnace for melting vitreous substances, a melting chamber having an inclined supporting surface, a plurality of baffles upon and partially across said surface at approximately right angles thereto, the ends of alternate baffles being in staggered relationship to each other.

10. In a furnace for melting vitreous substances, means for introducing the material to be melted, means for melting the material, said furnace having side walls and an inclined bottom, and stationary means, other than said bottom and said side walls, for causing at least a part of the melted material to flow in a tortuous path over said bottom to a container therefor.

11. In a stationary furnace for melting vitreous substances, a melting chamber, a supporting surface therein, means for melting the materials for forming the vitreous substance at one end of the supporting surface, and means for causing the melted substance to flow a plurality of times transversely over the supporting surface to a container at the other end thereof.

12. In a stationary furnace for the melting of vitreous substances, a melting chamber having an inclined supporting surface and transversely disposed flow distorting elements on said surface each terminating short of one lateral edge of said surface, the elements being progressively higher above said surface toward the lower end thereof.

PAUL G. WILLETTS.